(12) United States Patent
Evenson et al.

(10) Patent No.: US 10,114,909 B1
(45) Date of Patent: Oct. 30, 2018

(54) SYSTEMS AND METHODS STORING A COLLECTION OF ITEM DATA

(71) Applicant: AMAZON TECHNOLOGIES, INC., Reno, NV (US)

(72) Inventors: Andrew Ross Evenson, Seattle, WA (US); David Kerch Weber, Seattle, WA (US)

(73) Assignee: AMAZON TECHNLOGIES, INC., Reno, NV (US)

( * ) Notice: Subject to any disclaimer, the term of this patent is extended or adjusted under 35 U.S.C. 154(b) by 623 days.

(21) Appl. No.: 14/275,616

(22) Filed: May 12, 2014

(51) Int. Cl.
*G06F 17/30* (2006.01)

(52) U.S. Cl.
CPC .. *G06F 17/30949* (2013.01); *G06F 17/30595* (2013.01)

(58) Field of Classification Search
CPC ......... G06F 17/30949; G06F 17/30595; G06F 17/30
See application file for complete search history.

(56) References Cited

U.S. PATENT DOCUMENTS

| 7,647,329 | B1* | 1/2010 | Fischman | G06F 17/30094 707/999.1 |
| 8,489,436 | B1* | 7/2013 | Panzitta | G06Q 10/087 705/7.38 |
| 8,650,156 | B1* | 2/2014 | McHugh | G06F 17/30194 707/638 |
| 2015/0254272 | A1* | 9/2015 | Regni | G06F 17/30227 707/694 |

OTHER PUBLICATIONS

Sriram Ramabhadran, et al., "Prefix Hash Tree: An Indexing Data Structure over Distributed Hash Tables", [online] [retrieved on May 12, 2014] Retrieved from the Internet: <http://www.tribler.org/trac/raw-attachment/wiki/P2PWidgets/Prefix%20Hash%20Tree.pdf>, 2004.

* cited by examiner

*Primary Examiner* — Kristopher Andersen
(74) *Attorney, Agent, or Firm* — Lindauer Law, PLLC

(57) ABSTRACT

Described herein are storage systems, computer readable mediums, and methods for overcoming storage limitations associated with storage systems. The storage system may generate manifest data which includes information used to locate data stored in a distributed hash table system. The distributed hash table system may store data as read-only data. The storage system may include a variety of different manifest data generated for different versions of objects.

20 Claims, 12 Drawing Sheets

SYSTEMS AND METHODS STORING A COLLECTION OF ITEM DATA

BACKGROUND

Large internet-based enterprises such as e-commerce companies may collect and store large amounts of data including customer information, product information, sales records, shipping data, and so forth. Typically, such an enterprise will operate one or more data warehouses that include a large number of databases or clusters of databases. As an e-commerce business expands and its business needs grow, traditional data warehousing methods may be insufficient to handle increased query loads and increased requirements for storage capacity.

Figure 1:
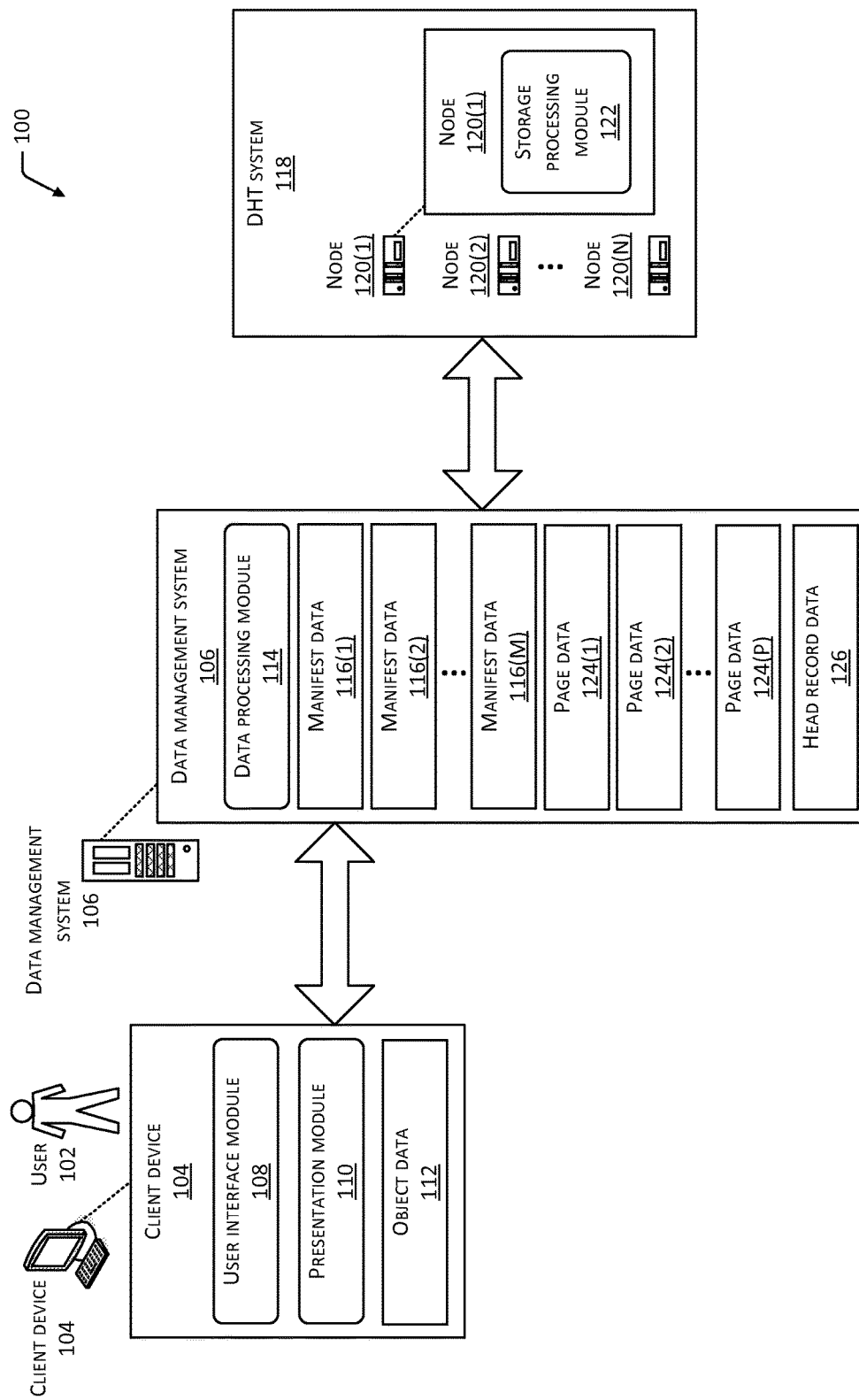
FIG. 1 is an illustrative system for generating manifest data used to retrieve items stored in a distributed hash table system.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure relates to systems and methods for overcoming limitations associated with storage systems. Databases are organized according to database models. Database models determine the logical structure of databases, and determine the manner in which data may be stored, organized, and manipulated. Database models may include models such as relational models and non-relational models. Non-relational models may include models such as key-value pair models, object models, network models, and so forth.

The system discussed herein may store information in a distributed hash table (DHT) system which may be described as a decentralized distributed system that provides a lookup service similar to a hash table which uses a data structure that maps keys to values. The DHT system may comprise one or more nodes that operatively connected to one another. The node may comprise a computing device such as a server. The one or more nodes are configured to store and retrieve data. The DHT system may be configured to store data as read-only or fixed data. That is, once the data is stored in the DHT system, the data in the DHT may not be modified. The DHT system is configured to store non-relational tables based on the non-relational model.

The system may include a data management system comprising one or more computing devices such as one or more servers. The data management system may be operatively connected to the DHT system and a client device. The client device may comprise one or more computing devices such as a personal computer or a server.

The client device may be configured to generate object data. The object data may represent an assortment of related information. In one example, the system enables e-commerce transactions such that a user of the client device may purchase goods using software managed by the data management system. In this example, the user's name is John. The user places an order for a first number (e.g., 5) of first products (e.g., sticks) and a second number (e.g., 9) of second products (e.g., stones). In this example, the object data may comprise information about the transaction such as identification information of the user, identification information of the products ordered, information indicating the amount of products ordered, and so forth.

The object data may include, among other information, one or more items. An item may include an item identification (ID) and one or more attributes that are associated with the item ID. The attributes may comprise byte arrays and may be representative of various data such as information about a user associated with a purchase, information about which products have been ordered, information about how many products have been ordered, shipment history, and so forth. Continuing with the example, the object data may include an assortment of information related to John's purchase of 5 sticks and 9 stones. A first item may include a first attribute "Customer: John" that is associated with a first item ID "Purchase/1". A second item may include a second item ID "Item/2" that is associated with the following attributes: "Quantity: 5" and "Product: Sticks". A third item may include a third item ID "Item/3" that is associated with the following attributes "Quantity: 9" and "Product: Stones".

The client device may provide the object data to the data management system for processing. The data management system may process the object data such that the items of the object data are stored across one or more memory locations of one or more of the nodes of the DHT system. The DHT system may be configured to store billions of different items across the nodes of the DHT system. A memory location may comprise one or more memory address spaces.

The DHT system may store an object having a relatively large amount of items in a single node or across more than one node. As objects continue to grow in size, locating, retrieving, and updating a desired group of items across the DHT system may become difficult. For example, the DHT system may store billions of items, and a particular object may include one thousand items which may need an update. Looking up each of the thousand items for updating from a pool of billions of items may be relatively time consuming. The DHT system described herein is configured to store the items as read-only or fixed data. Accordingly, when an object is updated, the DHT system may not perform the time consuming process of looking up each of the items for an update process. Rather, the new information would be stored in a different memory location.

The data management system may generate page data. The page data may comprise a file including one or more items. The page data may be associated with a page ID which identifies the page data. For example, first page data may include or be associated with page ID "pg1", and second page data may include or be associated with page ID "pg2". As discussed in more detail below, the data management system may generate different page data for different items of an object.

The data management system may generate manifest data. The manifest data may comprise information used to find certain items stored in the DHT system. In some implementations, the manifest data includes the items IDs, and page IDs that are associated with the item IDs. The manifest data may be persistently stored in the DHT system.

Continuing with the example above with regard to John's purchase of 5 sticks and 9 stones, the data management system may generate different page data for the items of the object data. The data management system may segregate the items of the object data such that first page data includes the first item (i.e., information about John), second page data includes the second item (i.e., information about the purchase of 5 sticks), and third page data includes the third item (i.e., information about the purchase of 9 stones). The first page data may be associated with a first page ID (e.g., "pg1"), the second page data may be associated with a second page ID (e.g., "pg2"), and the third page data may be associated with a third page ID (e.g., "pg3"). The segregation may be based on a variety of factors. In one example, the data management system segregates the items into the page data based on the type of key-value stores being implemented by the DHT system.

The data management system may generate manifest data used to locate the first, second, and third items stored in the DHT system. For the first item, the manifest data may include the first item ID (e.g., "Purchase/1") and the first page ID (e.g., "pg1") which is associated with the first item ID. For the second item, the manifest data may include the second item ID (e.g., "Item/2") and the second page ID (e.g., "pg2") which is associated with the second item ID. For the third item, the manifest data may include the third item ID (e.g., "Item/3") and the third page ID (e.g., "pg3") which is associated with the third item ID. In this example, when the data management system receives a request to provide at least one of the first, second, or third items, the data management system may use the manifest data to determine which file or memory location these items are located. For example, in response to receiving a request to provide the first item, the data management system may analyze the manifest data to determine that the first item is stored at "pg1".

In some implementations, the data management system generates manifest data in response to a modification to the object data. Continuing with the example, at a second time, the user John may modify the purchase such that the quantity of sticks is modified from 5 to 3, or an additional good may be added to the purchase. In these implementations, the data management system may generate second manifest data which reflects the modifications to the object data. The first object data may be described as object data having a first revision, and the second object data (which includes the modifications) may be described as object data having a second revision. The second object data may be generated based on the first object data. For example, the second object data may include some of the information that was included in the first object data. Continuing with the example, the second object data includes the same purchaser information as the first object data, namely, the first item which includes the item ID "Purchase/1" and the attribute "Customer: John". The DHT system may store the modified or added items in new page data (e.g., page data having a page ID "pg4"). The data management system may generate the second manifest data which includes the item IDs of the modified or added items and the page IDs which are associated with these item IDs.

When the data management system generates new manifest data, the previously generated manifest data remains stored intact. The manifest data is persistently stored. By keeping the previously generated manifest data, various advantages are provided. For example, a previously generated manifest may be used as a fall back manifest if a new manifest has a problem.

The data management system may proactively generate manifest data based on other information. The proactive generation may be based on an anticipated user modification of previously generated object data. Continuing with the example, the data management system may analyze account information associated with the user John and determine that John's historical shipping information indicates that he has previously shipped orders to three different house addresses. The data management system may proactively generate different manifest data for each of the three different house addresses which may include the shipping costs associated with the three different house addresses. Here, the data management system anticipates that the user John will select one of the three house addresses for shipment. In this example, the different manifest data may include page IDs which indicates where to find the house addresses that are stored in the DHT system. By proactively generating the manifest data for the different shipping destinations before the user selects a shipping destination, a user of the client device may experience a relatively faster ordering experience because the calculations for the selected shipping destination have already been completed.

Illustrative System

FIG. 1 is an illustrative system 100 configured to generate manifest data used to retrieve items stored in a DHT system. A user 102 is depicted with a corresponding client device 104 configured to present information to the user 102 for consumption.

The client device 104 may include a personal computer, a tablet computer, a server, a television, a set-top box, a gaming console, an in-vehicle entertainment system, a portable media player, and so forth. In some implementations, the client device 104 is implemented using other computing devices such as one or more servers. The client device 104 may include or is communicatively coupled to one or more display output devices suitable for presenting information.

The client device 104 may be coupled to a remote control using a communication link. The remote control may serve as an input device or input/output device for the client device 104. For example, the remote control may include one or more of a touch sensor, button, accelerometer, gyroscope, camera, microphone, speaker, haptic output device, and so forth. The communication link may be optical, radio frequency, acoustic, and so forth. In one implementation the communication link may use a personal area network interface, such as one compliant with the Bluetooth® specification. In some implementations, the remote control may comprise another device such as a smartphone, tablet computer, and so forth which is communicatively coupled to the client device 104.

The system 100 may include a data management system 106. The data management system 106 may comprise one or more computing devices such as one or more servers. The one or more servers may be physical server devices or virtual servers executing on physical server devices.

The data management system 106 may be operatively connected to the client device 104 using one or more networks (not shown). The one or more networks may include one or more public networks such as the Internet, private networks, or a combination of both. The network facilitating communication between the client device 104 and the data management system 106 may include a variety of networks, such as a local network, a wide area network ("WAN"), broadcast network, a personal area network, a wired and wireless local area network ("LAN"), and so forth. In some implementations, the network includes at least one of Ethernet, Wi-Fi™ as promulgated by the Wi-Fi Alliance, 3G and 4G, Bluetooth® as promulgated by the Bluetooth® Special Interest Group, and so forth. In some implementations, the devices and systems described herein are configured to directly connect to each other.

The client device 104 may include a user interface module 108 configured to provide a user interface to the user 102 and accept inputs responsive to the user interface. The user interface may include one or more visual, audible, or haptic elements. For example, the user interface may be configured to provide a graphic user interface, an audible user interface, and so forth The client device 104 may include a presentation module 110 that is configured to present information to the user 102 using output devices of the client device 104. For example, the presentation may include displaying the information using a display device of the client device 104, or producing audio using speakers of the client device 104.

The client device 104 may be configured to generate object data 112. The object data 112 may represent an assortment of related information. For example, the system 100 may enable e-commerce transactions such that the user 102 may buy goods using software managed by the data management system 106. At a first time, the user 102 logs into the client device 104 and places an order for a first number (e.g., 5) of first products and a second number (e.g., 10) of second products. In this example, the object data 112 may include information about the transaction such as identification information of the user 102, identification information of products ordered, amount information indicating the amount of products ordered, and so forth. At a second time, the user 102 changes the order such that a third number (e.g., 20) of the second products and a fourth number (e.g., 3) of third products are added. In this example, the object data 112 may include information about the transaction which includes the changed number of second products and the added number of third products. The object data may include one or more items. The object data 112 and the one or more items are discussed in more detail below with regard to FIGS. 2 and 4.

The data management system 106 may include a data processing module 114 configured to process various data. The data processing module 114 may be configured to generate page data 124(1), 124(2), . . . 124(P). The page data 124 may comprise a file configured to store one or more items of an object. In one example, the page data 124(1) comprises a first file that includes information identifying goods ordered at a first time, and the page data 124(2) comprises a second file that includes information identifying goods ordered at a second time. The data management system 106 may be configured to persistently store the page data 124 in the DHT system 118. The page data 124 is discussed in more detail below with regard to FIGS. 2, 5, and 7.

The data processing module 114 may be configured to generate manifest data 116(1), 116(2), . . . 116(M). As used in this disclosure, letters in parenthesis such as "(M)" indicate an integer value. Manifest data 116 may include information used to locate certain data that is stored in a DHT system 118. The manifest data 116 is discussed in more detail below with regard to FIGS. 2, 5, and 7.

The DHT system 118 may comprise a plurality of nodes 120(1), 120(2), . . . 120(N). The node 120 may comprise one or more servers configured to store and retrieve certain information. The node 120 includes a storage processing module 122 configured to store or retrieve certain information in one or more memory locations. The DHT system 118 may be operatively connected to the data management system 106 using the network described above.

The data processing module 114 may generate head record data 126. The head record data 126 may comprise information that is used to identify which manifest data 116 is current. The current manifest data 116 may be described as the controlling or governing manifest data 116. The manifest data 116 that comprises the current manifest data 116 may be set based on input received from the user 102. In one example, where the system 100 enables e-commerce transactions, the data management system 106 may analyze the user's 102 purchase history and determine that the user 102 has historically shipped ordered goods to either a first address or a second address. Before the user 102 enters an address for shipping a particular purchase, the data management system 106 may proactively generate first manifest data 116 representing information about the purchase including the first address, and the data management system 106 may proactively generate second manifest data 116 representing information about the purchase including the second address. If the user 102 requests that the goods be sent to the first address, the data management system 106 generates head record data 126 indicating that the first manifest data 116 is the current manifest data 116, and if the user 102 requests that the goods be sent to the second address, the data management system 106 generates head record data 126 indicating that the second manifest data 116 is the current manifest data 116. The head record data 126 may be described as a pointer which refers to one of a plurality of different manifest data 116.

The head record data 126 may enable a plurality of client devices 104 to generate different revisions of objects in parallel. For example, a first client device 104 may generate a first revised object generating a revision of an object The head record data 126 may be mutable. That is, the state of the head record data 126 may be modified after the head record data 126 has been generated. The head record data 126 may be changed based on requests received from the client device 104. Whether the head record data 126 is able to be modified may be based on one more conditions. The one or more conditions may include a determination of whether the request received from the client device 104 includes certain identification information.

Figure 2:
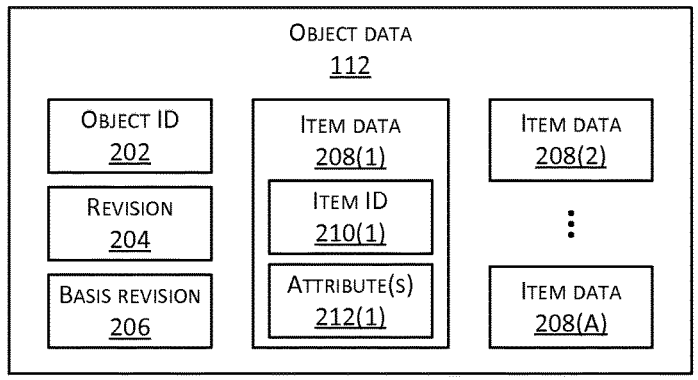
FIG. 2 illustrates examples of the object data, the manifest data and the page data.
Figure 2:
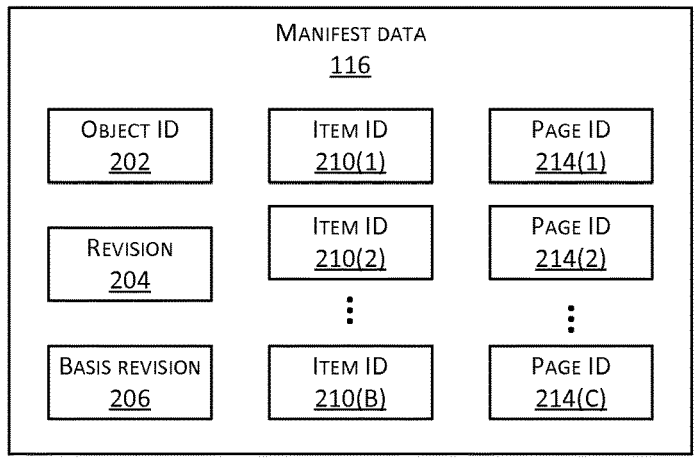
Figure 2:
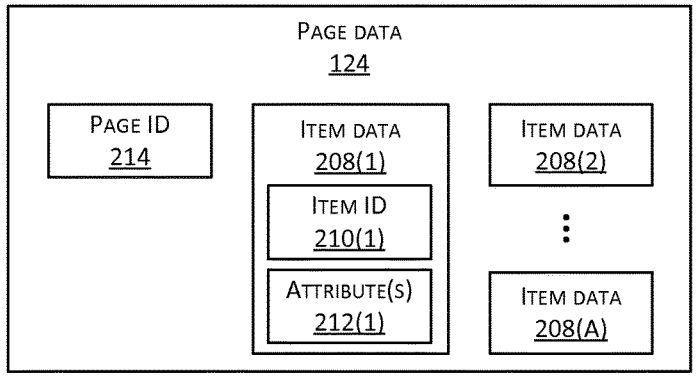

FIG. 2 illustrates examples of the object data 112, the manifest data 116, and the page data 124. The object data 112 may include an object ID 202 representing a unique identification associated with the object data 112. In one example, the unique identification may include an alphanumeric such as "Purchase/2".

The object data 112 may include a revision 204 representative of an identification associated with a version of the object data 112. The revision 204 may be a unique reference that is arbitrarily generated and may comprise a globally unique identifier ("GUID"). For example, a first revision 204 of object data 112 may include first information (e.g., an alphanumeric such as "v0"), and a second revision 204 of the object data 112 may include different information (e.g., an alphanumeric such as "v1"). The client device 104 may be configured to generate and assign the revision 204 to a particular object. As discussed in more detail below with regard to FIG. 6, in one example, a new revision 204 of an object may be generated when the user 102 modifies an existing order of products.

The object data 112 may include a basis revision 206 representative of an identification of a particular revision 204 of previously generated object data 112. Object data 112 may be generated based on other object data 112. For first object data 112, the basis revision 206 may identify which other object data 112 the first object data 112 was generated based on. For example, the basis revision 206 may comprise "v0" which indicates that a particular object data 112 is generated based on previously generated object data 112 that has a revision 204 "v0". The basis revision 206 is discussed in more detail with regard to FIG. 6.

The object data 112 may include item data 208(1), 208(2), . . . 208(A). The item data 208 may represent various items which include an item ID 210 associated with one or more attributes 212. The item ID 210 may represent an identification number associated with the one or more attributes 212. The information stored in the one or more attributes 212 may be represented as an array data structure representing various information. For example, a first item may include an item ID 210 comprising the alphanumeric "Purchase/2", and the following attribute 212 "Customer: John" which is associated with the item ID 210 "Purchase/2". In this example, the attribute 212 "Customer: John" indicates the name of the user 102. In another example, the item ID 210 may include the alphanumeric "Item/1" which is associated with the following attributes 212: "Qty: 91" and "Product: sticks". In this example, the attributes 212 indicate that the user 102 has placed an order for 91 sticks.

The manifest data 116 may include the object ID 202, the revision 204, the basis revision 206, and the item ID 210. The manifest data 116 may include page IDs 214(1), 214(2), . . . 214(C). The page ID 214 may represent an identification which may be used to locate information associated with the page ID 214. In one example, the page ID 214(1) includes the alphanumeric "pg1", and the page ID 214(2) includes the alphanumeric "pg2".

The manifest data 116 may include or be associated with a manifest key that is used to locate the manifest data 116 stored in the DHT system 118. The manifest key may comprise the object ID 202 and the revision 204.

The page data 124 may comprise a file including one or more item data 208. The page data 124 may include the page ID 214. For example, in FIG. 2, the page data 124 includes the item data 208(1), 208(2), . . . 208(A). The determination of which item data 208 is included in a particular page data 124 may be based on a variety of factors. In one example, the data management system 106 segregates different item data 208 into different page data 124 based on the type of key-value stores being implemented by the DHT system 118.

Figure 3:
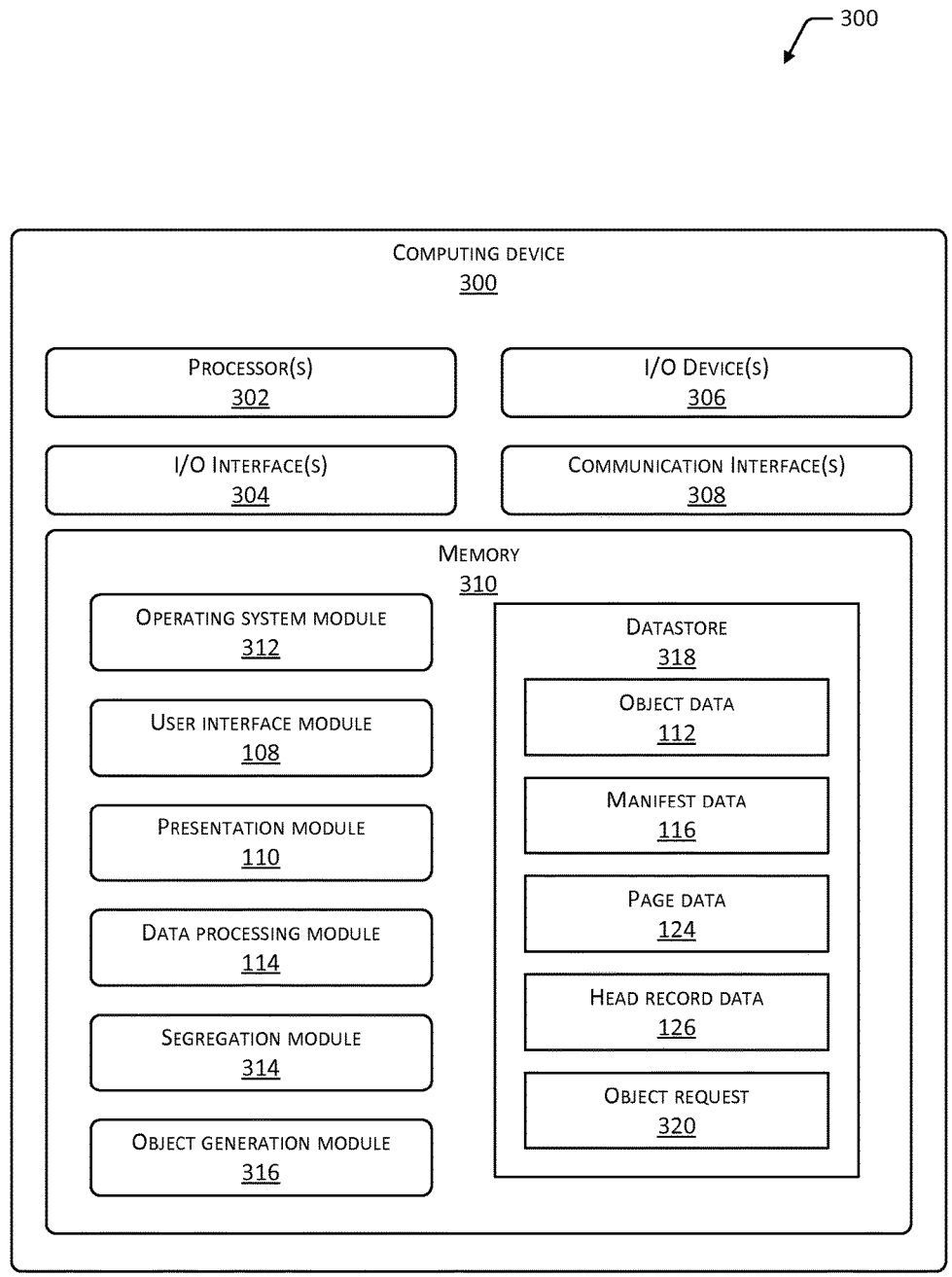
FIG. 3 is a block diagram of a computing device configured to store and retrieve items in the DHT system using page identifications.

FIG. 3 is a block diagram of a computing device 300 configured to store and retrieve items in the DHT system 118 using page IDs 214. At least one of the client device 104, the data management system 106, or the nodes 120 may be implemented as the computing device 300. The computing device 300 may include at least one hardware processor 302 (or "processor") configured to execute stored instructions. The at least one hardware processor 302 may comprise one or more cores.

The computing device 300 includes at least one I/O interface 304 which enables portions of the computing device 300 (e.g., the hardware processor 302) to communicate with other devices. The I/O interface 304 may be configured to implement various protocols, such as inter-integrated circuit ("I2C"), serial peripheral interface bus ("SPI"), Universal Serial Bus ("USB"), RS-232, HDMI, TOSLINK, Bluetooth®, and so forth. The at least one I/O interface 304 may be operatively connected to at least one I/O device 306. In some implementations, certain I/O devices 306 are physically incorporated with the computing device 300 or externally placed.

The at least one I/O interface 304 may be operatively connected to one or more I/O devices 306. The I/O devices 306 may include input devices such as one or more of a keyboard, a touch sensor, and so forth. The I/O devices 306 may also include output devices such as one or more of a display, printer, and so forth. In some embodiments, the I/O devices 306 may be physically incorporated with the computing device 300 or may be externally placed and communicatively coupled thereto.

The computing device 300 may include at least one communication interface 308. The communication interface 308 may be configured to provide communications between the computing device 300 and other devices, routers, access points, and so forth. The communication interface 308 may include an Ethernet interface which connects to the network.

The computing device 300 may also include one or more busses or other internal communications hardware or software that allow for the transfer of data between the various modules and components of the computing device 300.

As illustrated in FIG. 3, the computing device 300 may include at least one memory or memory device 310. The memory 310 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 310 may include computer readable instructions, data structures, program modules, and other data for the operation of the computing device 300.

The memory 310 may include at least one operating system ("OS") module 312. The OS module 312 may be configured to manage hardware resources such as the I/O interface 304, the I/O devices 306, the communication interface 308, and provide various services to applications or modules executing on the hardware processor 302. The memory 310 may also store at least one of the following modules which may be executed as foreground applications, background tasks, daemons, and so forth.

The memory 310 may include the user interface module 108 configured to provide a user interface to the user 102 or to the client device 104. In one implementation, the user interface may be a web interface presented via the network and accessible to the user 102. In another implementation the user interface may comprise an application programming interface ("API") which enables communication such as sending requests for items from the client device 104 to the data management system 106.

The memory 310 may include the presentation module 110 that is configured to present information (e.g., the object data 112) using output devices of the client device 104. The presentation may include displaying the information using a display device of the client device 104, or producing audio using speakers of the client device 104.

The memory 310 may include the data processing module 114 configured to process various data. The data processing module 114 may be configured to generate the page data 124. In one example, the data processing module 114 generates the page data 124 based on the generation of object data 112 by the client device 104. In another example, the data processing module 114 is configured to generate new page data 124 based on other information such as historical information associated with the user 102.

The data processing module 114 may be configured to generate the manifest data 116. The data processing module 114 may be configured to generate the manifest data 116 using the object data 112 that was provided by the client device 104 as input. In some implementations, the data processing module 114 generates the manifest data 116 based on information other than the object data 112. For example, the data management system 114 may proactively generate manifest data 116 based on an anticipated user modification of previously generated object data 112.

The data processing module 114 may generate the head record data 126. The head record data 126 may comprise information that is used to identify which manifest data 116 is current. The data processing module 114 may generate the head record data 126 based on a request received from the client device 104. For example, for a particular object, three different manifest data 116 may have been previously generated. The data processing module 114 may receive a request from the client device 104 that indicates a request for one of the three previously generated manifest data 116 to be set as the current manifest data 116.

The memory 310 may include a segregation module 314 configured to segregate the items of the object data 112. Segregating the items may include causing first page data 124 to store a first portion of object data 112, and second page data 124 to store a second portion of the object data 112. In one example, the segregation module 314 segregates the items of the object data 112 based on the type of key-value stores being implemented by the DHT system 118.

The memory 310 may include an object generation module 316 configured to generate the object data 112. In some implementations, the client device 104 includes the object generation module 316. In some implementations, the data management system 106 includes the object generation module 316. As discussed in more detail below with regard to FIG. 8, the object generation module 316 may generate object data 112 and provide the generated object data 112 from the data management system 106 to the client device 104.

In some implementations, the memory 310 includes a datastore 318 for storing information. The datastore 318 may use a flat file, database, linked list, tree, or other data structure to store the information. In some implementations, the datastore 318, or a portion thereof, may be distributed across at least one other device, such as a server, a network storage device, and so forth. As illustrated in FIG. 3, the datastore 318 may include at least one of the object data 112, the manifest data 116(1), 116(2), . . . 116(M), the page data 124, the head record data 126, or object request 320 (discussed in more detail below). The datastore 318 may include the other data (not shown) which may include information such as administrator preferences, account information associated with the user 102, and so forth.

The object request 320 may represent a request for certain information (e.g., items) which are stored by the DHT system 118. The object request 320 may specify certain characteristics which are used by at least one of the data management system 106 and the DHT system 118 to select items. For example, the characteristic may indicate that the user 102 is requesting items which have item IDs 210 that include the word "purchase". The data management system 106 may query the manifest data 116 for item IDs 210 that include the word "purchase". Once those item IDs 210 are determined, the page IDs 214 that are associated with the item IDs 210 may be used to efficiently locate the items stored in the DHT system 118.

Figure 4:
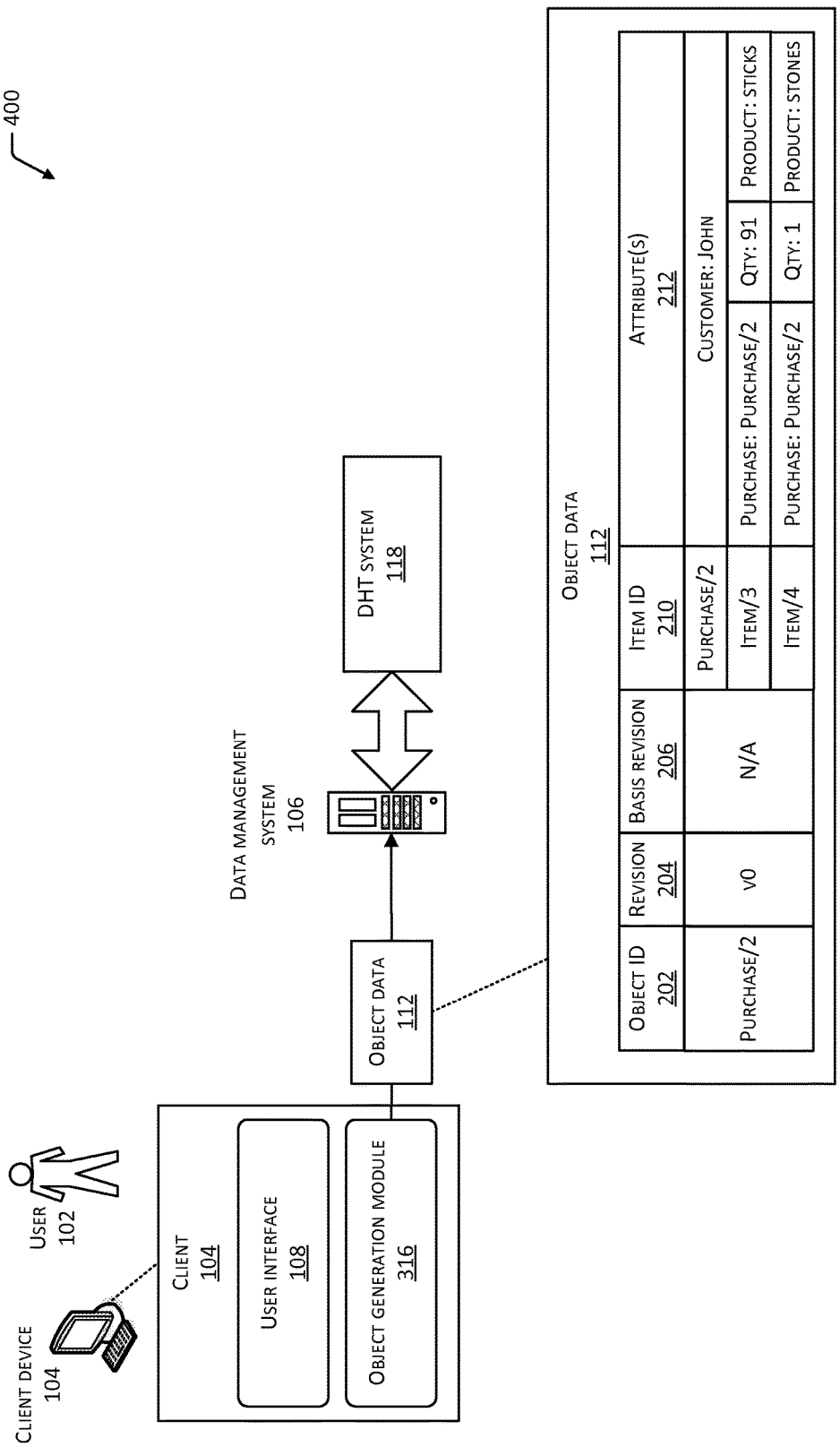
FIG. 4 is an illustrative system configured to generate the object data.

FIG. 4 is an illustrative system 400 configured to generate the object data 112. As discussed in more detail below, in this example, the user 102 "John" places an order for 91 sticks and 1 stone. This information is included in the object data 112 depicted in FIG. 4.

The client device 104 includes the object generation module 316 configured to generate the object data 112. The object data 112 represents an assortment of related information. The object data 112 may be generated in response to the user 102 placing an order for goods using the user interface of the client device 104.

The object data 112 includes the object ID 202 "Purchase/2" which comprises an identification of the object data 112. The object data 112 also includes revision 204 "v0" which identifies the version of the object data 112. As discussed in more detail with regard to FIG. 6, when the object data 112 is modified, a different revision 204 (e.g., "v1") may be assigned to the object data 112.

The object data 112 includes basis revision 206. Because the object data 112 depicted in FIG. 4 is not generated based on a previously-generated revision 204, there is no basis revision 206. Accordingly, in this example, the basis revision 206 is depicted such that "N/A" is included in the field designated for the basis revision 206. As discussed in more detail with regard to FIG. 6, the basis revision 206 may include data that indicates that the object data 112 is generated based on previously-generated object data 112.

The object data 112 includes three items depicted as three rows. The first item includes: 1) the attribute 212 "Customer: John"; and 2) the item ID 210 "Purchase/2" which is associated with the attribute 212. This attribute 212 indicates that the user 102 of the client device 104 that placed the order has a name "John".

The second item includes: 1) second attributes 212 "Qty: 91" and "Product: sticks"; and 2) the item ID 210 "Item/3" which is associated with the second attributes 212. The second item indicates that the user 102 placed an order for 91 sticks.

The third item includes: 1) third attributes "Qty: 1" and "Product: stones"; and 2) the item ID 210 "Item/4" which is associated with the third attributes. The third item indicates that the user 102 placed an order for 1 stone. Once the object data 112 is received by the data management system 106, the data management system 106 generates manifest data 116 and page data 124 for the received object data 112.

Figure 5:
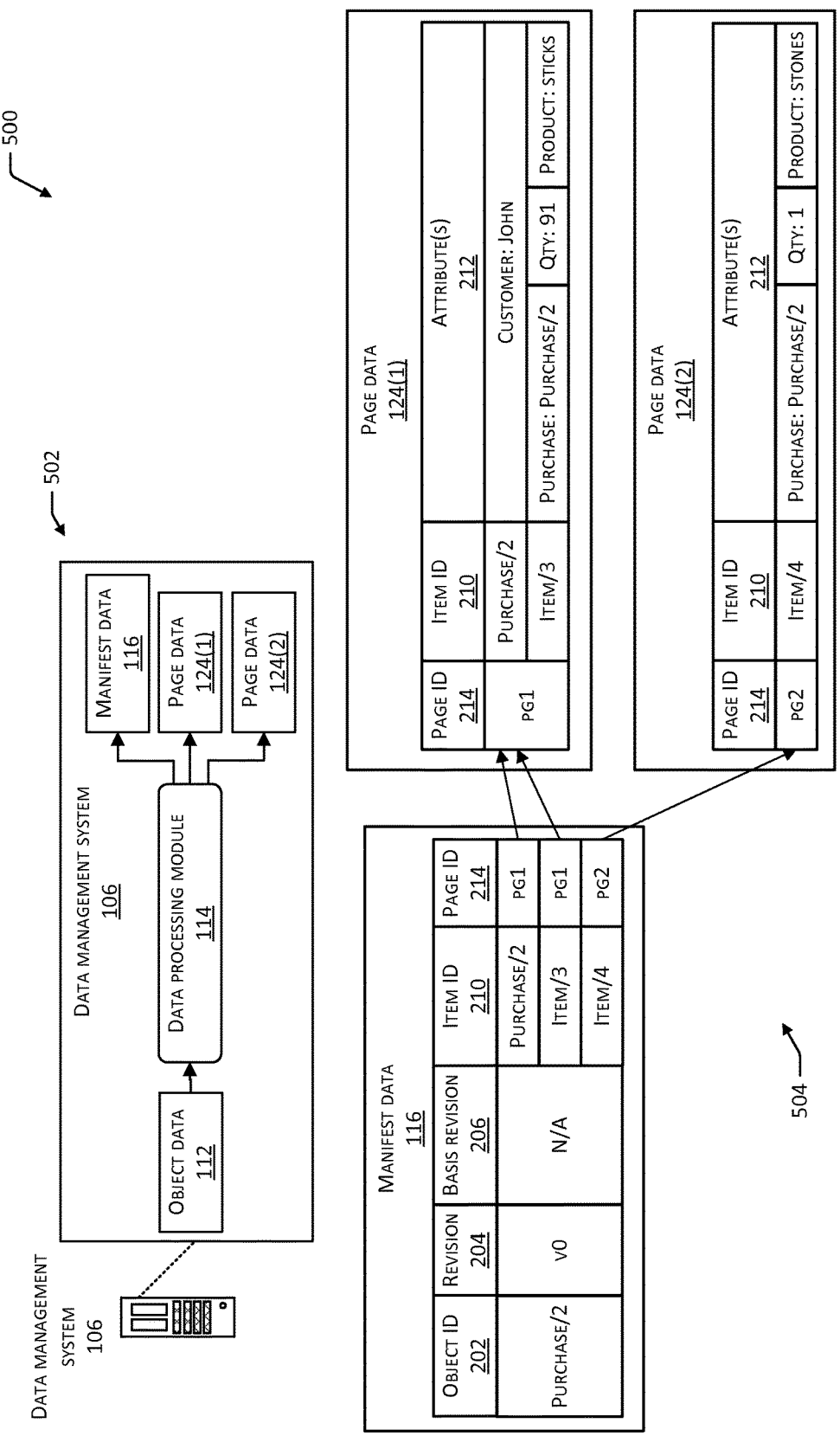
FIG. 5 depicts an illustration of the generation of the manifest data and the page data, and depicts the manifest data being associated with the page data.

FIG. 5 depicts an illustration 500 of the generation of the manifest data 116 and page data 124(1) and 124(2), and depicts the manifest data 116 being associated with the page data 124(1) and the 124(2). At 502, the data processing module 114 generates the manifest data 116 and the page data 124(1) and 124(2) using the object data 112 depicted in FIG. 4 as an input.

At 504, an association between the manifest data 116 and the page data 124(1) and 124(2) is depicted. The manifest data 116 includes the object ID 202 "Purchase/2", and the revision 204 "v0" which identifies the version of the object data 112. In this example, the manifest key may comprise "Purchase/2:v0". The manifest data 116 includes the basis revision 206. Because the object data 112 depicted in FIG. 4 is not generated based on an already-generated revision 204, there is no basis revision 206. Accordingly, the basis revision 206 is depicted such that "N/A" is included in the field designated for the basis revision 206.

The manifest data 116 includes item IDs 210 which are associated with page IDs 214. The page IDs 214 represent identifications which are used to locate items stored in the page data 124. In this example, the manifest data 116 includes: 1) the item ID 210 "Purchase/2" and page ID 214 "pg1" which is associated with the item ID 210 "Purchase/2"; 2) the item ID 210 "Item/3" and the page ID 214 "pg1" which is associated with the item ID 210 "Item/3"; and 3) the item ID 210 "Item/4" and the page ID 214 "pg2" which is associated with the item ID 210 "Item/4".

In FIG. 5, the items of the object data 112 are segregated in the page data 124(1) and page data 124(2). The determination of which items are stored at which page data 124 may be determined based on a variety of factors. In one example, the factors include the type of key-value stores being implemented by the DHT system 118 or a determination of the costs associated with storing items in one or more memory locations. Certain types of key-value stores may have certain limitations such as memory capacity limitations.

The depicted page data 124(1) and 124(2) may be stored in one or more nodes 120. For example, a single node 120 may store the page data 124(1) and 124(2), or the page data 124(1) may be stored in a first node 120(1) and the page data 124(2) may be stored in a second node 120(2).

The page data 124(1) includes the page ID 214 "pg1" which is an identification of the page data 124(1). The association of the page ID 214 with the page data 124 and the association of the item IDs 210 with the page data 214 are used by at least one of the data management system 106 or the DHT system 118 to locate the items stored by the page data 124. For example, if the client device 104 requests the item which has an item ID 210 of "Item/4", the data management system 106 may query the manifest data 116 for the item ID 210 which includes "Item/4" and determine that the item that includes this item ID 210 is located at the page data 124(2) which has a page ID 214 of "pg2".

The page data 124(1) includes two of the three items of the object data 112 depicted in FIG. 4. The page data 124(1) includes the first item which includes the item ID 210 "Purchase/2" and the associated attribute 212 "Customer: John". The page data 124(1) also includes the item ID 210 "Item/3" and the following associated attributes 212: "Purchase: Purchase/2", "Qty: 91"; and "Product: sticks". The page data 124(2) includes page ID 214 "pg2" and the following associated attributes 212: "Purchase: Purchase/2", "Qty: 1"; and "Product: stones".

Figure 6:
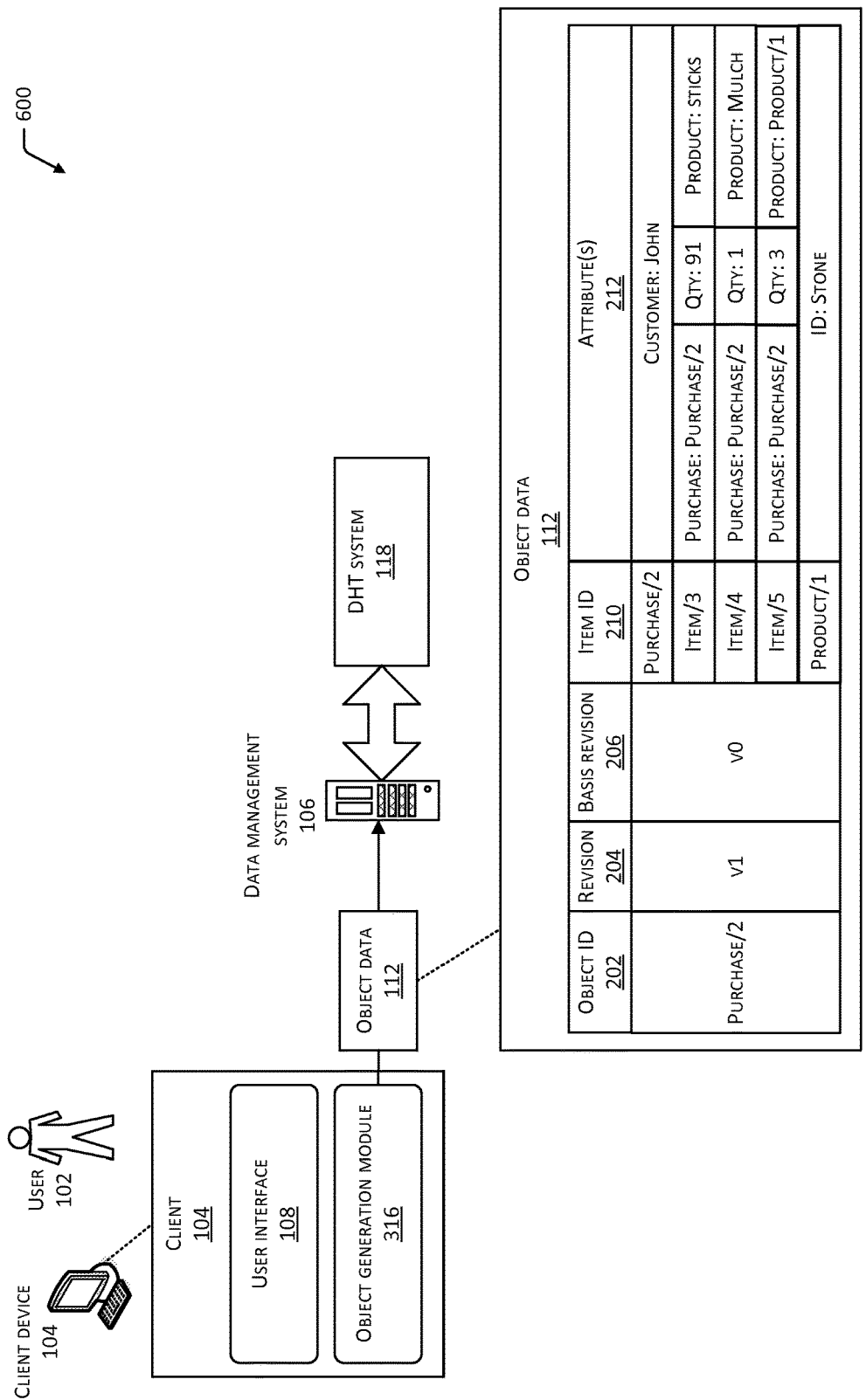
FIG. 6 is an illustrative system configured to modify the object data.

FIG. 6 is an illustrative system 600 illustrating a modification of the object data 112. In this example, the object generation module 316 generates the object data 112 in response to the user 102 changing the already placed order discussed above with regard to FIG. 4.

The object data 112 includes the object ID 202 "Purchase/2" which comprises an identification of the object data 112. The object data 112 represents a collection of information associated with the order placed by the user 102.

Because the object data 112 is modified, the object data 112 includes revision 204 "v1" which identifies the version of the object data 112. For the object data 112 depicted in FIG. 6, the client device 104 generates a revision 204 (i.e., "v1") that is different from the revision 204 (i.e., "v0") generated for the previously generated object data 112 depicted in FIG. 4.

In FIG. 6, the object data 112 includes the basis revision 206 "v0" which indicates that the object data 112 depicted in FIG. 6 is generated based on object data 112 having the revision 206 "v0" which is depicted in FIG. 4.

The object data 112 in FIG. 6 includes five items depicted as five rows. The first item is the same as the first item described above with regard to FIG. 4 and includes the attribute 212 "Customer: John" and includes the item ID 210 "Purchase/2". The second item is also the same as the second item described above with regard to FIG. 4 and includes second attributes 212 "Qty: 91" and "Product: sticks". The second item also includes the item ID 210 "Item/3" which is associated with the second attributes 212.

The third item of the object data 112 depicted in FIG. 6 includes the following three attributes 212: "Purchase: Purchase/2"; "Qty:1"; and "Product: Mulch". When compared to the third item of the object data 112 depicted in FIG. 4, the third item has been modified. More specifically, the third item of the object data 112 depicted in FIG. 6 now includes the attribute 212 "Product: Product/Mulch" and does not include "Product: Sticks". Such a modification may be made in response to the user 102 changing the order to include 1 order of mulch and not the 1 stone. The third item also includes the item ID 210 "Item/4" which is associated with the attributes 212 "Purchase: Purchase/2"; "Qty:1"; and "Product: Mulch".

The object data 112 includes two new items which include the fourth item that includes the following three attributes 212: "Purchase: Purchase/2"; "Qty: 3"; and "Product: Product/1". The fifth item includes the attribute 212 "ID: Stone", and the item ID 210 "Product/1" which is associated with the attribute 212 "ID: Stone". The fifth item indicates that product/1 corresponds to stones. The fourth and fifth items may be generated in response to the user 102 adding the two stones to the "Purchase/2" order. Once the object data 112 depicted in FIG. 6 is received by the data management system 106, the data management system 106 generates manifest data 116 and page data 124 for the received object data 112.

Modified object data 112 may or may not include other information that was included in the object data 112 before the object data 112 was modified. For example, the object data 112 depicted in FIG. 6 may not include the "Purchase/2" item ID 210 and the attribute 212 associated the "Purchase/2" item ID 210, and the "Item/3" item ID 210 and the attribute 212 associated with the "Item/3" item ID 210. This data may not be included because this data was already included in the object data 112 depicted in FIG. 4.

Figure 7:
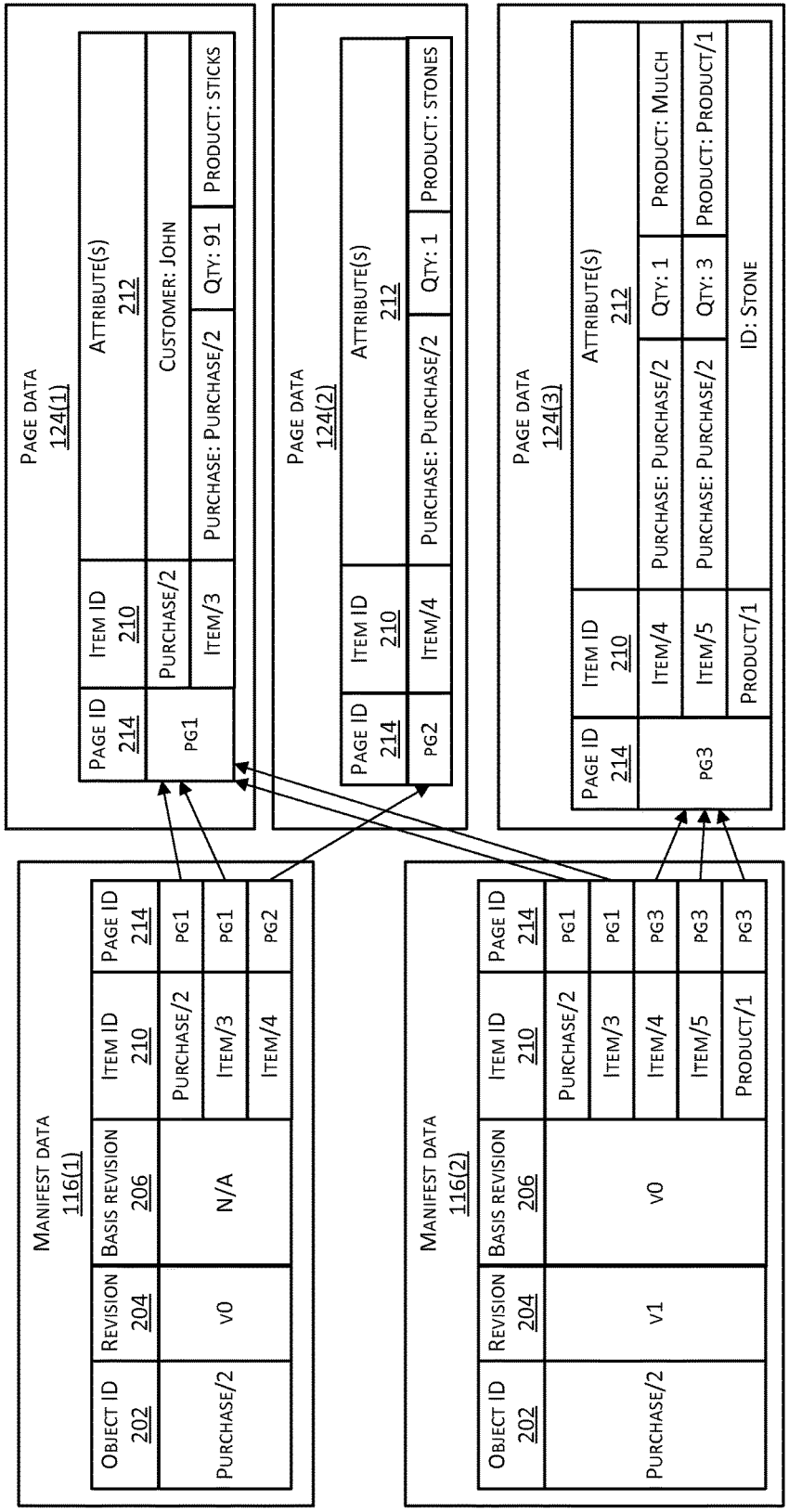
FIG. 7 depicts an illustration of the association between different manifest data and different page data.

FIG. 7 depicts an illustration of the association between different manifest data 116 and different page data 124. In this example, the depicted manifest data 116(1), page data 124(1), and 124(2) are the same as the manifest data 116, page data 124(1), and 124(2) depicted in FIG. 5.

In FIG. 7, manifest data 116(2) is depicted. The data processing module 114 (not shown) generates the manifest data 116(2) and the page data 124(3) using the revised object data 112 depicted in FIG. 6 as an input.

The manifest data 116(2) includes the object ID 202 "Purchase/2", and the revision 204 "v1" which identifies the version of the object data 112. In this example, the manifest key may comprise "Purchase/2:v1". The manifest data 116 (2) includes the basis revision 206 "v0" indicating that the manifest data 116(2) was generated based on the manifest data 116(1) which includes the revision 204 "v0".

The manifest data 116(2) includes item IDs 210 which are associated with page IDs 214. The page IDs 214 represent identifications which are used to locate items stored in the page data 124(1) and 124(4). The manifest data 116(2) includes: 1) the item ID 210 "Purchase/2" and page ID 214 "pg1" which is associated with the item ID 210 "Purchase/ 2"; 2) the item ID 210 "Item/3" and the page ID 214 "pg1" which is associated with the item ID 210 "Item/3"; 3) the item ID 210 "Item/4" and the page ID 214 "pg3" which is associated with the item ID 210 "Item/4"; 4) the item ID 210 "Item/5" and the page ID 214 "pg3" which is associated with the item ID 210 "Item/5"; and 5) the item ID 210 "Product/ 1" and the page ID 214 "pg3" which is associated with the item ID 210 "Product/1".

The page data 124(3) includes the modified item and the added items. The modified item comprises the row of data that includes the following attributes 212: "Purchase: Purchase/2"; "Qty: 1"; and "Product: Mulch". The modified item also includes the item ID 210 "Item/4" which is associated with these attributes 212. The first added item is depicted as a row that includes the attributes 212 "Purchase: Purchase/2"; "Qty:2"; and "Product: Product/1". The first added item also includes the item ID 210 "Item/5" which is associated with these attributes 212. The second added item is depicted as a row that includes the attribute 212 "ID: Stone". The second added item also includes the item ID 210 "Product/1" which is associated with this attribute 212.

The page data 124(3) includes the page ID 214 "pg3" which is an identification of the page data 124(3). The arrows depicted in FIG. 7 which extend from the manifest data 116 to the page data 124 illustrate how the different manifest data 116 are associated with the page data 124. The page IDs 214 of the manifest data 116(2) indicate that certain items are located in the page data 124(1) and certain other items are located in the page data 124(3).

FIG. 7 depicts a plurality of different manifest data 116(1) and 116(2). As described above, the data management system 106 may generate head record data 126 that comprises information identifying which manifest data 116 comprises the current manifest data 116. Continuing with the example, once the user 102 "John" modifies his order to include the items depicted in the object data 112 of FIG. 6, the data management system 106 may generate head record data 126 that comprises information identifying the manifest data 116(2) as the current manifest data 116. As discussed above, the manifest data 116 is persistently stored in the DHT system 118. Accordingly, even though the current manifest data 116 may change from the manifest data 116(1) to the manifest data 116(2), the manifest data 116(1) remains stored in the DHT system 118.

Figure 8:
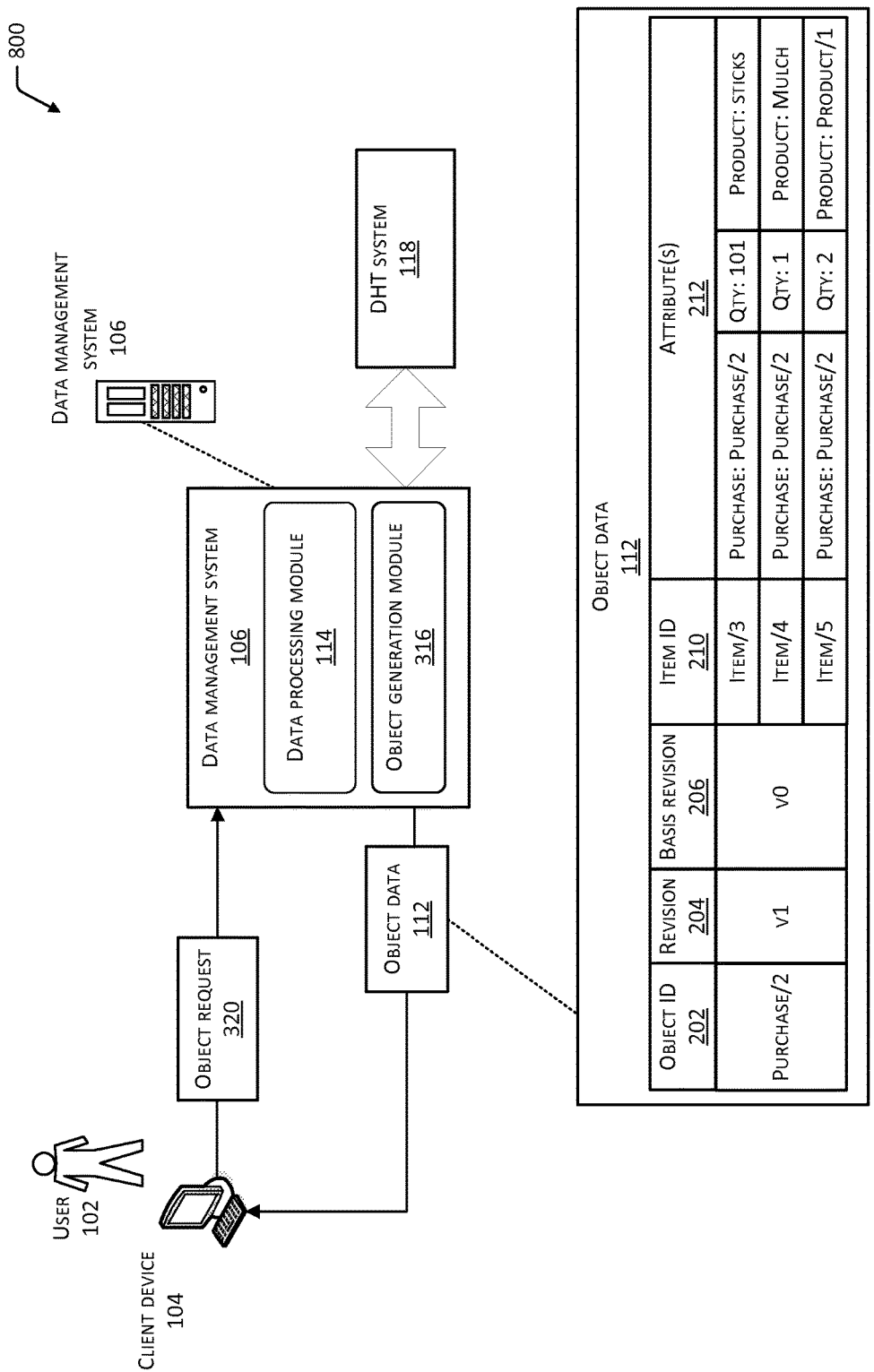
FIG. 8 is an illustrative system configured to provide object data based on an object request.

FIG. 8 is an illustrative system 800 configured to provide object data 112 based on object request 320. The object request 320 may comprise data indicating a request for certain items having certain IDs with certain characteristics. The client device 104 generates and provides the object request 320 to the data management system 106. The client device 104 may generate and provide the object request 320 based on inputs received from the user 102.

The object request 320 may represent a request for certain information which is stored by the DHT system 118. The object request 320 may include information used by the data management system 106 to select which items to provide to the client device 104. In FIG. 8, the object request 320 comprises information requesting items having a characteristic that includes item IDs 210 beginning with the word "Item", and that the version of the object is revision 204 "v1". Once the data management system 106 receives the object request 320, the data management system 106 may query the manifest data 116 that corresponds to the identified object and the identified revision 204 which is "Purchase/2" and "v1". The data processing module 114 queries the identified manifest data 116 for item IDs 210 beginning with "Item". As described above with regard to FIGS. 5 and 7, the item IDs 210 of the manifest data 116 correspond to page IDs 214. Once the item IDs 210 are found, the data management system 106 may provide the item IDs 210 and the page IDs 214 to the DHT system 118.

The DHT system 118 may use the item IDs 210 and the page IDs 214 to lookup the items stored in the various page data 124. The DHT system 118 may provide the requested items to the data management system 106.

Once the requested items have been provided to the data management system 106, the object generation module 316 may generate the object data 112 depicted in FIG. 8. The items depicted in the object data 112 each include Item IDs 210 that begin with the word "Item".

Although the example depicted with regard to FIGS. 4 to 8 is directed to data that relates to a system that enables e-commerce transactions for purchasing goods, the data being processed by the systems and methods described herein may comprise data that relates to other types of systems. For example, the system may be described as a gift certificate management system that manages data for generating and providing gift certificates to users 102. In this system, the object data 112 and the page data 124 may include information representing a message (e.g., "Congratulations!") for a particular gift certificate, email addresses for the recipients of the gift certificates, image data that may be included in the gift certificates, and so forth. In another example, the system may include a social networking system. In this system, the object data 112 and the page data 124 may include data representing posts, identifications of contacts or friends, and so forth.

Figure 9:
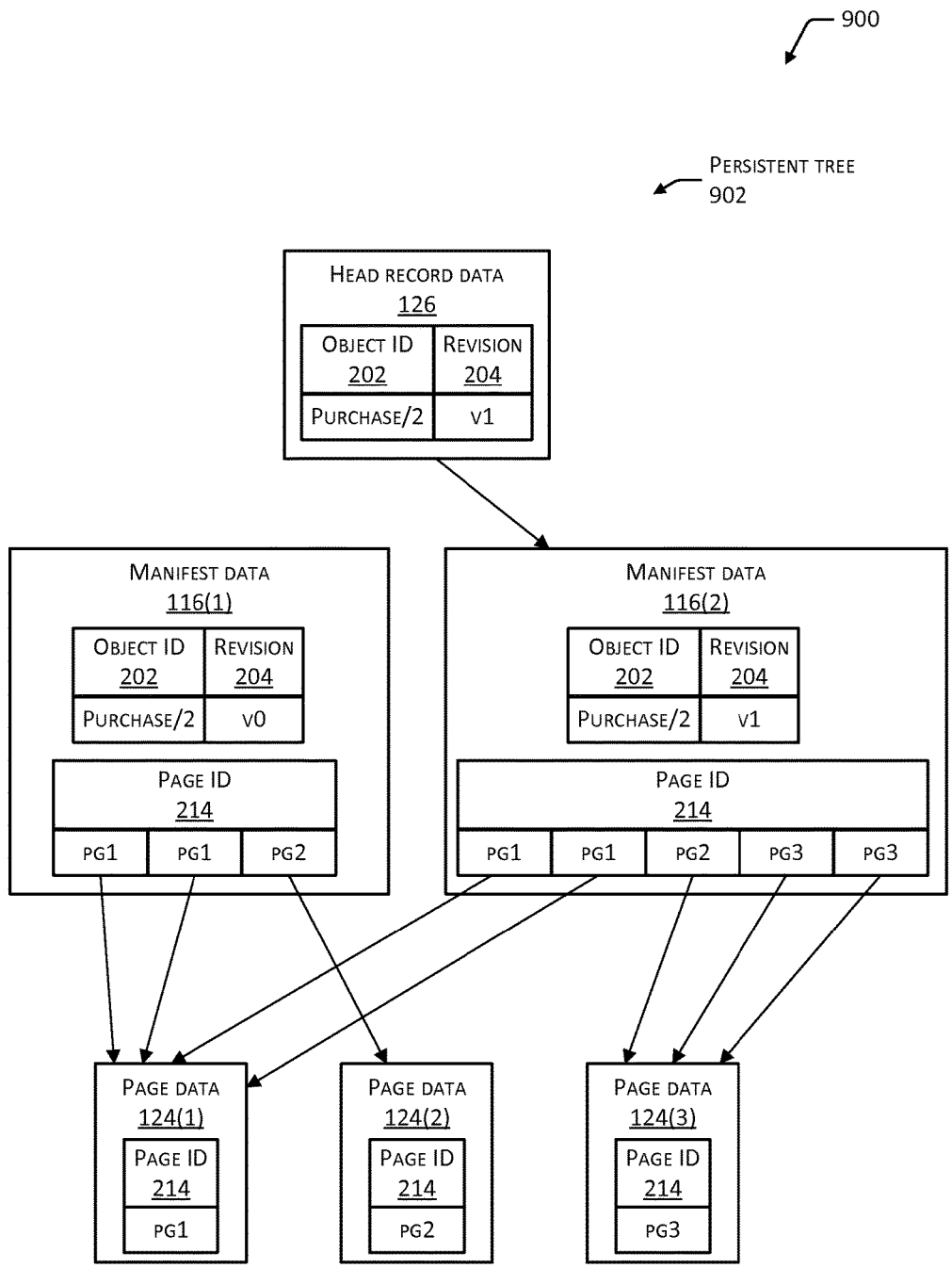
FIG. 9 depicts a persistent tree data structure, illustrating the association between different manifest data and different page data, including head record data identifying one of the manifest data as current manifest data.

FIG. 9 depicts a persistent tree 902 data structure, illustrating the association between different manifest data 116 and different page data 124, including head record data 126 identifying one of the manifest data 116 as current manifest data 116.

The manifest data 116(1) and 116(2), as well as the page data 124(1), 124(2) and 124(3) depicted in FIG. 9 are the same as the manifest data 116 and the page data described above with regard to FIG. 7. The persistent tree 902 data structure includes the head record data 126. As described above with regard to FIG. 1, the head record data 126 is used to identify which manifest data 116 is the current manifest data 116. In FIG. 9, the arrow extending from the head record data 126 to the manifest data 116(2), and the information included within the head record data 126 indicates that the manifest data 116(2) is the current manifest data 116.

The persistent tree 902 data structure enables the data management system 106 to efficiently organize and retrieve a relatively large amount of dynamically changing information. The manifest data 116 and the page data 124 depicted in the persistent tree 902 data structure are persistently stored by the DHT system 118. As described above with regard to FIG. 1, the head record data 126 may be changed based on requests received by the client devices 104.

Figure 10:
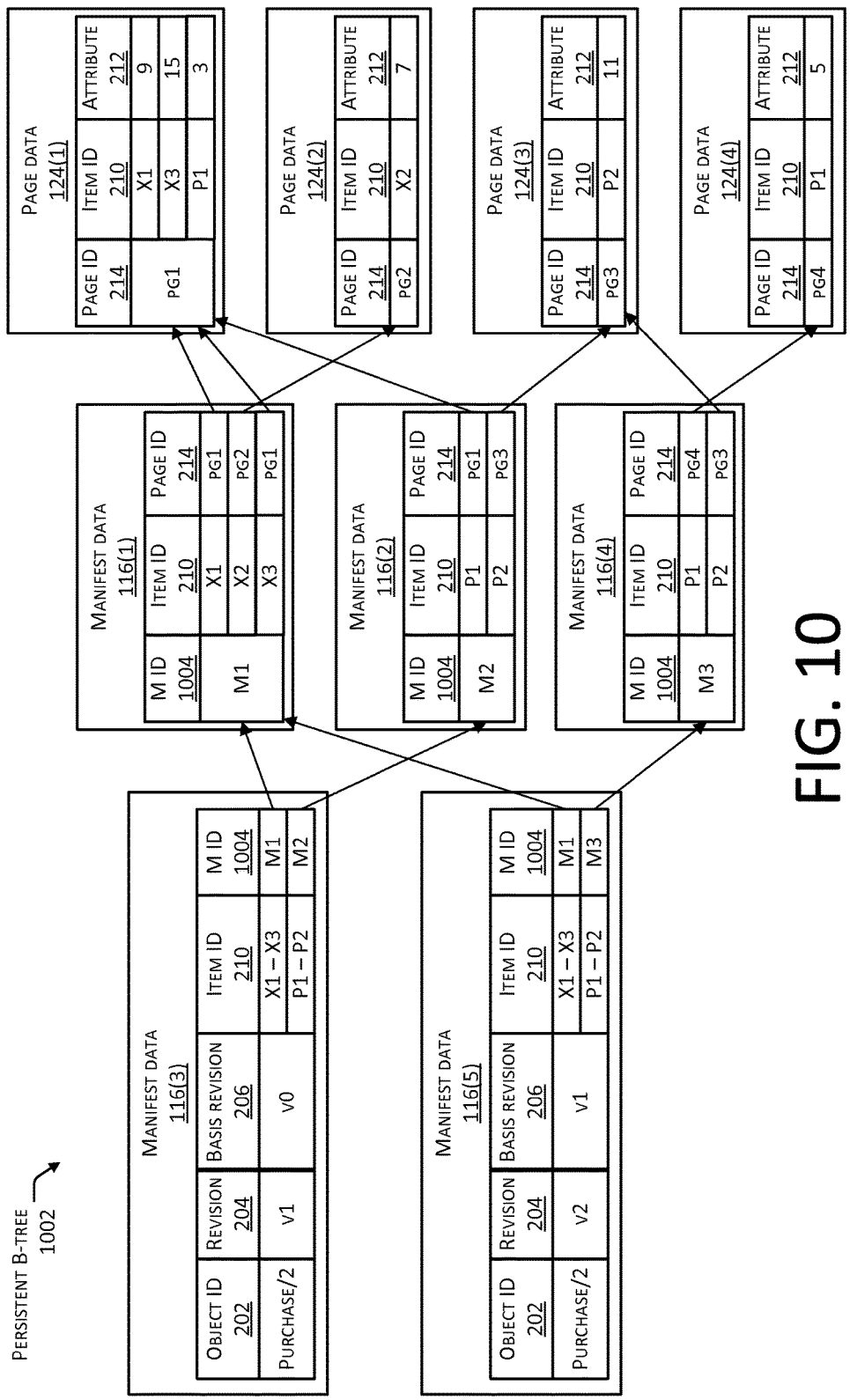
FIG. 10 depicts a persistent B-tree data structure, illustrating the association between different manifest data and different page data, including manifest data being associated with other manifest data.

FIG. 10 depicts a persistent B-tree 1002 data structure, illustrating the association between different manifest data 116 and different page data 124. In this example, certain manifest data 116 is associated with other manifest data 116.

Briefly, at a first time, the data management system 106 generates manifest data 116(1), 116(2), and 116(3), and page data 124(1), 124(2), and 124(3). This data may be generated by the data management system 106 in response to the user 102 placing an order that includes different amounts or different goods. At a second time, the data management system 106 generates manifest data 116(4) and 116(5) and page data 124(4). This data may be generated by the data management system 106 in response to the user 102 causing a modification to the order of goods.

The manifest data 116(1) includes manifest ID ("M ID") 1004 that comprises data identifying the manifest data 116(1). In this example, the manifest ID 1004 for the manifest data 116(1) is "M1". The manifest data 116(1) includes item IDs 210 which are associated with page IDs 214. In this example, the manifest data 116(1) includes: 1) the item ID 210 "X1" and page ID 214 "pg1" which is associated with the item ID 210 "X1"; 2) the item ID 210 "X2" and the page ID 214 "pg2" which is associated with the item ID 210 "X2"; and 3) the item ID 210 "X3" and the page ID 214 "pg1" which is associated with the item ID 210 "X3".

The manifest data 116(2) includes the manifest ID 1004 "M2" that identifies the manifest data 116(2). In this example, the manifest data 116(2) includes: 1) the item ID 210 "P1" and page ID 214 "pg1" which is associated with the item ID 210 "P1"; and 2) the item ID 210 "P2" and the page ID 214 "pg3" which is associated with the item ID 210 "P2".

The manifest data 116(3) includes the object ID 202 "Purchase/2", and the revision 204 "v1" which identifies the version of the object data 112. In this example, the manifest key may comprise "Purchase/2:v1". The manifest data 116(3) includes the basis revision 206 "v0" indicating that the manifest data 116(3) was generated based on other manifest data 116 (not shown) which includes the revision 204 "v0".

The manifest data 116(3) includes item IDs 210 which are associated with the manifest IDs 1004. The manifest IDs 1004 represent identifications which are used to locate information stored in other manifest data 116. The manifest data 116(3) includes: 1) the item ID 210 "X1-X3" and manifest ID 1004 "M1" which is associated with the item ID 210 "X1-X3"; and 2) the item ID 210 "P1-P2" and the manifest ID 1004 "M2" which is associated with the item ID 210 "P1-P2".

The page data 124(1) includes the page ID 214 "pg1" which is an identification of the page data 124(1). The association of the manifest data 116(1) and 116(2) with the page data 124(1) are used by at least one of the data management system 106 or the DHT system 118 to locate the items stored by the page data 124(1). The page data 124(1) includes: 1) a first item which includes the item ID 210 "X1" and the associated attribute 212 "9"; 2) a second item which includes the item ID 210 "X3" and the associated attribute 212 "15"; and 3) a third item which includes the item ID 210 "P1" and the associated attribute 212 "3".

The page data 124(2) includes the page ID 214 "pg2" which is an identification of the page data 124(2). The page data 124(2) includes an item which includes the item ID 210 "X2" and the associated attribute 212 "7". The page data 124(3) includes the page ID 214 "pg3" which is an identification of the page data 124(3). The page data 124(3) includes an item which includes the item ID 210 "P2" and the associated attribute 212 "11".

At the second time, the data management system 106 generates manifest data 116(4) and 116(5) and page data 124(4). The manifest data 116(4) includes the manifest ID 1004 "M3" that identifies the manifest data 116(4). In this example, the manifest data 116(4) includes: 1) the item ID 210 "P1" and page ID 214 "pg4" which is associated with the item ID 210 "P1"; and 2) the item ID 210 "P2" and the page ID 214 "pg3" which is associated with the item ID 210 "P2".

The manifest data 116(5) includes the object ID 202 "Purchase/2", and the revision 204 "v2" which identifies the version of the object data 112. In this example, the manifest key may comprise "Purchase/2:v2". The manifest data 116(5) includes the basis revision 206 "v1" indicating that the manifest data 116(5) was generated based on the manifest data 116(3) which includes the revision 204 "v1".

The manifest data 116(5) includes item IDs 210 which are associated with the manifest IDs 1004. The manifest IDs 1004 represent identifications which are used to locate information stored in other manifest data 116. The manifest data 116(5) includes: 1) the item ID 210 "X1-X3" and manifest ID 1004 "M1" which is associated with the item ID 210 "X1-X3"; and 2) the item ID 210 "P1-P2" and the manifest ID 1004 "M3" which is associated with the item ID 210 "P1-P2".

The page data 124(4) includes the page ID 214 "pg4" which is an identification of the page data 124(4). The page data 124(4) includes an item which includes the item ID 210 "P1" and the associated attribute 212 "5".

By generating manifest data 116 that refers to other manifest data 116, the system 100 is configured to handle a relatively large amount of key sets. The system 100 may use this manifest data 116 to efficiently locate the items stored in the DHT system 118.

The persistent B-tree 1002 data structure enables the data management system 106 to efficiently organize and retrieve a relatively large amount of dynamically changing information. The manifest data 116 and the page data 124 depicted in the persistent B-tree 1002 are persistently stored by the DHT system 118.

Figure 11:
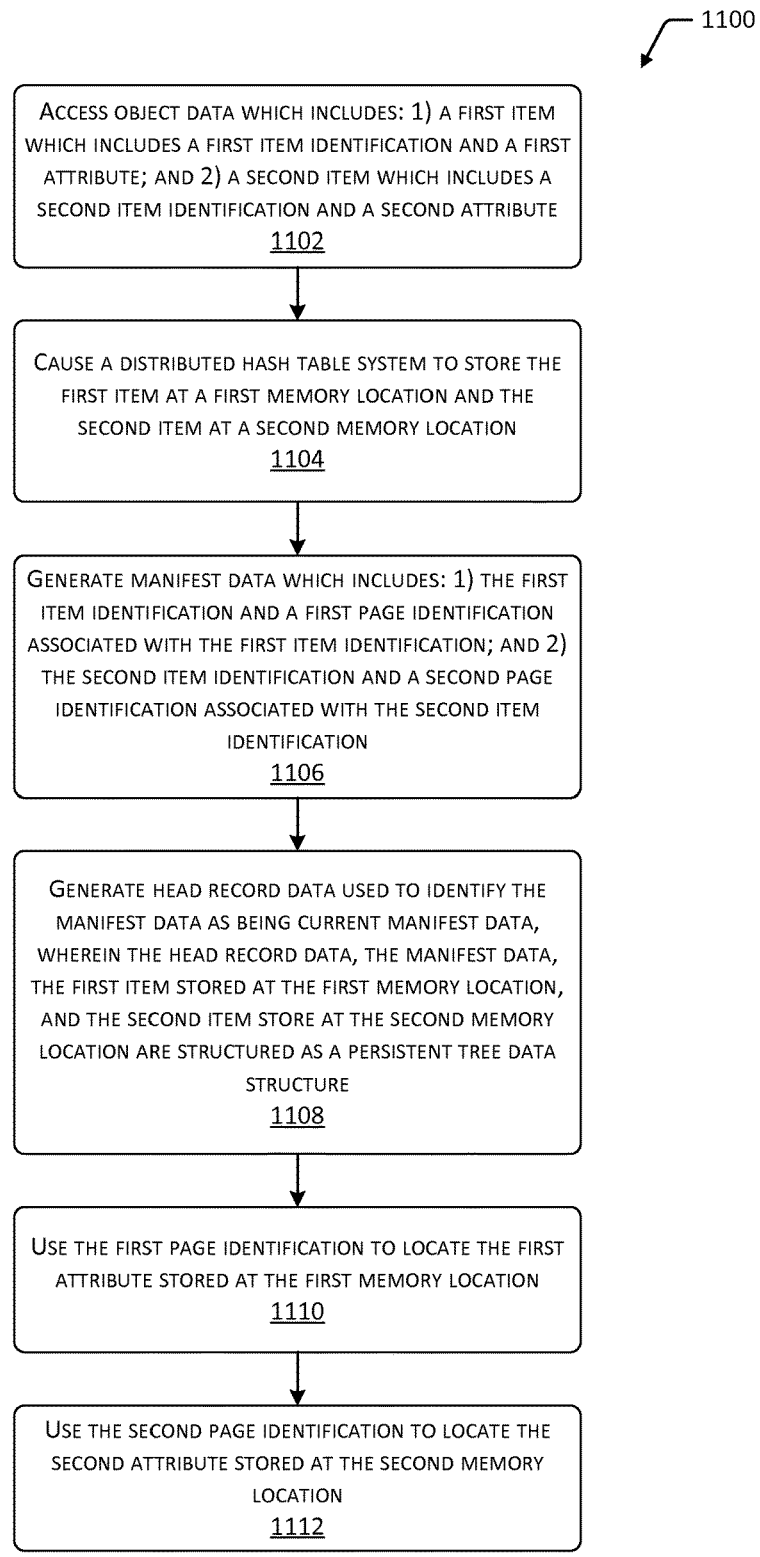
FIG. 11 is a flow diagram illustrating a process of using manifest data to locate items stored in a distributed hash table system.

FIG. 11 is a flow diagram illustrating a process 1100 of using manifest data 116 to locate items stored in the DHT system 118. Although the process 1100 is described with reference to the flowchart illustrated in FIG. 11, many other methods performing the acts associated with the process 1100 may be used. For example, the order of the steps may be changed, some of the steps described may be optional, and additional steps may be included.

At block 1102, the data management system 106 accesses object data 112. The object data 112 includes: 1) a first item which includes a first item ID 210 and a first attribute 212; and 2) a second item which includes a second item ID 210 and a second attribute 212. The object data 112 may be provided by the client device 104 to the data management system 106 using the network described above. The object data 112 may be generated in response to the user 102 placing an order for one or more goods. In one example, the first item includes a first item ID 210 "Item/4" and a first attribute 212 "Product: Sticks". The second item includes a second item ID 210 "Item/5" and a second attribute 212 "Product: Stones".

At block 1104, the data management system 106 causes the DHT system 118 to store the first item at a first memory location and the second item at a second memory location.

In one example, the first memory location represents the page data 124(1) and the second memory location represents the page data 124(2). The data management system 106 may cause the DHT system 118 to the store items at the memory locations by providing the items to the DHT system 118. Once the DHT system 118 receives the items from the data management system 106, the DHT system 118 stores the items.

At block 1106, the data management system 106 generates manifest data 116. The manifest data 116 includes: 1) the first item ID 210 and a first page ID 214 associated with the first item ID 210; and 2) the second item ID 210 and a second page ID 214 associated with the second item ID 210. In one example, the first item ID 210 includes "Item/4" and the first page ID 214 includes "pg1". The second item ID 210 includes "Item/5" and the second page ID 214 includes "pg2".

In some implementations, the data management system 106 may proactively generate manifest data 116 based on an anticipated user 102 modification of previously generated object data 112. For example, the data management system 106 may analyze account information associated with the user 102 determine that the user's 102 historical shipping information indicates that previously orders have been shipped to three different house addresses. The data management system 106 may generate different manifest data 116 for each of the three different house addresses. The different manifest data 116 may include page IDs 214 which indicate where to find the house addresses that are stored in the DHT system 118.

The data management system 106 may generate manifest data 116 based on other previously generated manifest data 116. In one example, at a first time, the data management system 106 generates first manifest data 116(1) and second manifest data 116(2). At a second time, the data management system 106 generates third manifest data 116(3) by combining or merging the first and second manifest data 116(1) and 116(2) together. In this example, when the data management system 106 generates the third manifest data 116(3), the data management system 106 may not generate new page data 124 because the items of the page data 124 are already persistently stored by the DHT system 118.

At block 1108, the data management system 106 generates the head record data 126 used to identify the manifest data 116 as being current manifest data 116. In this example, the head record data 126, the manifest data 116, the first item stored at the first memory location, and the second item store at the second memory location are structured as a persistent tree 902 data structure. The persistent tree 902 data structure may be structured such that previous versions of the manifest data 116 and the page data 124 are preserved when the manifest data 116 and the page data 124 are modified.

At block 1110, the DHT system 118 uses the first page ID 214 to locate the first attribute 212 stored at the first memory location. At block 1112, the DHT system 118 uses the second page ID 214 to locate the second attribute 212 stored at the second memory location. In one example, the client device 104 provides a request for the data management system 106 to provide items of particular object data 112 having a particular object ID 202 and a particular revision 206. The data management system 106 use the manifest data 116 that was generated for the particular object data 112 to look up the page IDs 214 associated with the item IDs 210. Using the page IDs 214, the items for the requested object data 112 may be retrieved from the DHT system 118.

Figure 12:
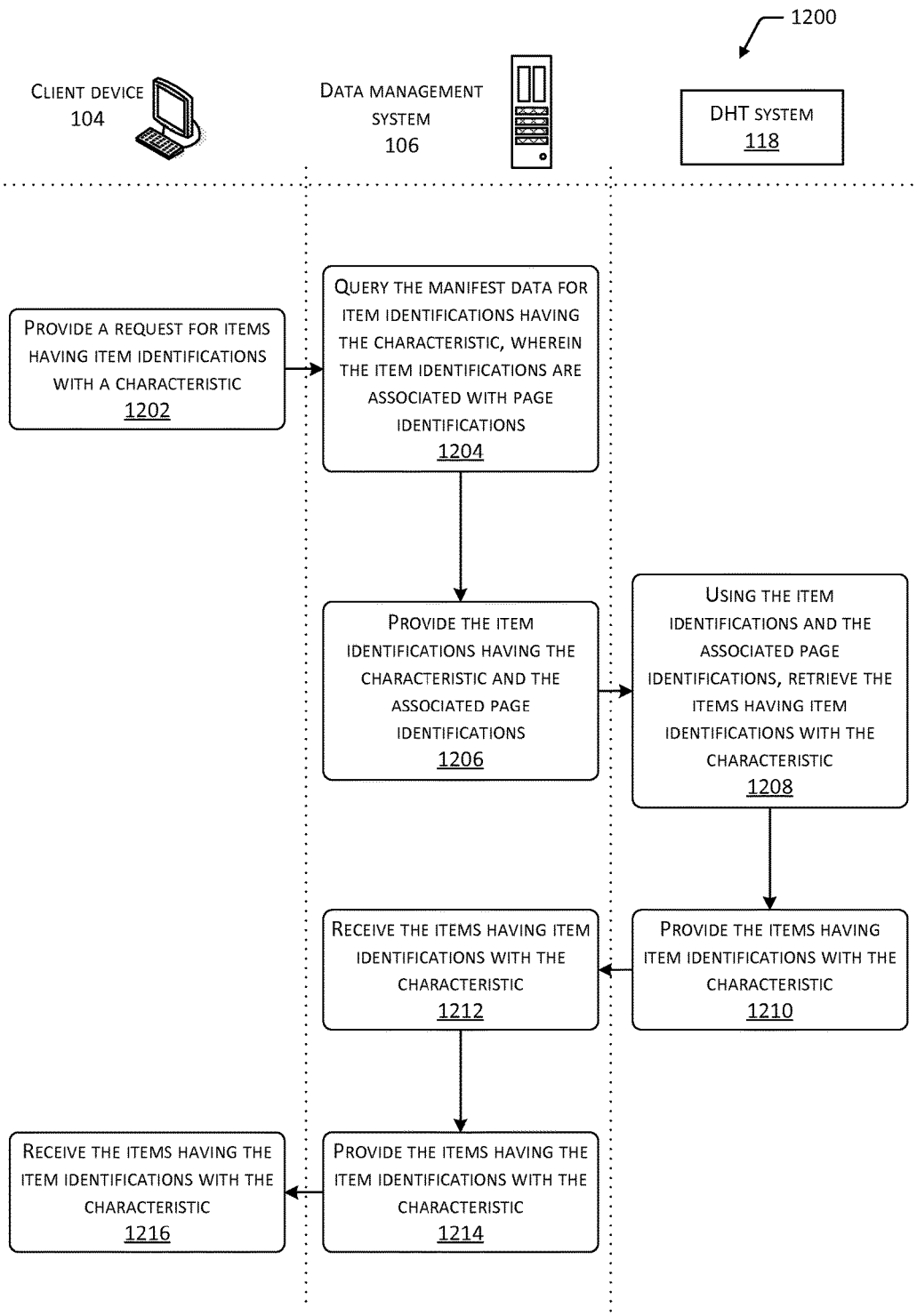
FIG. 12 is a flow diagram illustrating a process of providing items having item IDs with a certain characteristic.

FIG. 12 is a flow diagram illustrating a process 1200 of providing items having item IDs 210 with a certain characteristic. Although the process 1200 is described with reference to the flowchart illustrated in FIG. 12, many other methods performing the acts associated with the process 1200 may be used. For example, the order of the steps may be changed, some of the steps described may be optional, and additional steps may be included.

At 1202, the client device 104 provides a request for items having item IDs 210 with a characteristic. In one example, the characteristic represents items IDs 210 having a specified word such as "purchase" or "item". The request may also include information indicating which revision 204 of the manifest data 116 to use for querying. For example, the data management system 106 may include first manifest data 116 having the revision 204 "v0" and second manifest data 116 having the revision 204 "v1". The request may include a field that specifies to use the manifest data 116 having the revision 204 "v1".

At 1204, the data management system 106 queries the manifest data 116 for item IDs 210 having the characteristic. The item IDs 210 are associated with page IDs 214. For example, as described above in more detail with regard to FIG. 5, the item ID 210 is associated with the page ID 214 "pg1".

At 1206, the data management system 106 provides the item IDs 210 having the characteristic and the associated page IDs 214. At 1208, using the item IDs 210 and the associated page IDs 214, the DHT system 118 retrieves the items having item IDs 210 with the characteristic.

At 1210, the DHT system 118 provides the items having item IDs 210 with the characteristic. At 1212, the data management system 106 receives the items having item IDs 210 with the characteristic.

At 1214, the data management system 106 provides the items having the item IDs 210 with the characteristic. At 1216, the client device 104 receives the items having the item IDs 210 with the characteristic.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
    a communication interface;
    a memory storing computer-executable instructions;
    a distributed hash table (DHT) system storing N items; and
    a processor in communication with the communication interface, the DHT system, and the memory, the processor configured to execute the computer-executable instructions to:
        receive first object data describing information associated with an object comprising a subset of the N items including at least:
            a first item which includes a first item identification (ID) and a first attribute; and
            a second item which includes a second item ID and a second attribute;
        store, using the DHT system, the first item at a first memory location as read-only data and the second item at a second memory location as read-only data, wherein the second memory location is different from the first memory location;
        generate first manifest data which includes:
            the first item ID and a first page ID associated with the first item ID, wherein the first page ID identifies the first memory location used to locate the first attribute; and
            the second item ID and a second page ID associated with the second item ID, wherein the second page ID identifies the second memory location used to locate the second attribute;
        generate first head record data indicating the first manifest data is current;
        receive second object data describing information associated with the object, the second object data including:
            the first item;
            a modified item which includes the second item ID and a modified attribute that has been modified when compared to the second attribute of the second item;
            a third item which includes a third item ID and a third attribute;
        store, using the DHT system, the third item as read-only data at a third memory location, and the modified item including the second item ID and the modified attribute as read-only data at a fourth memory location without performing a look up of the second item including the second item ID and the second attribute at the second memory location and without performing an update at the second memory location to change the second attribute associated with the second item ID to the modified attribute associated with the second item ID, wherein the third memory location is different from the fourth memory location;
        generate second manifest data which includes:
            the first item ID and the first page ID that is associated with the first item ID, wherein the first page ID identifies the first memory location used to locate the first attribute;
            the third item ID and a third page ID associated with the third item ID, wherein the third page ID is used to identify the third memory location to locate the third attribute;
            the second item ID and a fourth page ID associated with the second item ID, wherein the fourth page ID is used to identify the fourth memory location to locate the modified attribute;
        generate second head record data by modifying the first head record data to indicate the second manifest data is current, the first manifest data remains stored intact as read-only data;
        receive, over a network, a request from a client device for the first item and the modified item;
        identify the second manifest data as being current using the second head record;
        responsive to identifying the second manifest data as being current, use the second manifest data to locate the first attribute associated with the first item ID at the first memory location by using the first page ID associated with the first item ID and to locate the modified attribute associated with the second item ID at the fourth memory location by using the fourth page ID associated with the modified item; and
        provide, over the network to the client device, the first attribute associated with the first item ID and the modified attribute associated with the second item ID.

2. The system of claim 1, wherein the processor is further configured to execute the computer-executable instructions to:
    generate third manifest data using historical shipping information associated with a user account; and
    generate third head record data in response to receiving a second request from the client device, wherein the third head record data identifies the third manifest data as the current manifest data.

3. The system of claim 1, wherein:
    the DHT system includes a plurality of nodes operatively connected to one another, the plurality of nodes including:
        a first node configured to store the first attribute and the second attribute as read-only information; and
        a second node configured to store the third attribute and the modified attribute as read-only information; and
    the first attribute is representative of at least one of:
        a purchased good;
        a customer associated with a purchase; or
        an amount of purchased goods.

4. A method comprising:
    accessing a distributed hash table (DHT) system storing N items;
    receiving first object data describing information associated with an object comprising a subset of the N items including at least:

a first item which includes a first item identification (ID) and a first attribute; and a second item which includes a second item ID and a second attribute;

causing the DHT system to store the first item at a first memory location as read-only data and the second item at a second memory location as read-only data, wherein the first item and the second item are stored as read-only information;

generating first manifest data which includes:

the first item ID and a first page ID associated with the first item ID, wherein the first page ID identifies the first memory location used to locate the first attribute; and the second item ID and a second page ID associated with the second item ID, wherein the second page ID identifies the second memory location used to locate the second attribute;

receiving second object data describing information associated with the object, the second object data including a modified item comprising the second item ID and a modified attribute representative of a modified second attribute associated with the second item ID;

causing the DHT system to store the modified item including the second item ID and the modified attribute as read-only data at a third memory location without performing a look up of the second item including the second item ID and the second attribute at the second memory location and without performing an update at the second memory location to change the second attribute associated with the second item ID to the modified attribute associated with the second item ID;

generating second manifest data representative of:

the first item ID and the first page ID associated with the first item ID; and the second item ID and a third page ID associated with the second item ID, wherein the third page ID identifies the third memory location used to locate the modified attribute;

generating head record data used to identify the second manifest data as being current manifest data, wherein the head record data, the second manifest data, the first item stored at the first memory location, and the modified item stored at the third memory location are structured as a persistent tree data structure;

receiving, over a network, a request from a client device for the first item and the modified item, using the head record data to identify the second manifest data as being current, and as a result of identifying the second manifest data as being current, using the second manifest data to locate the first attribute associated with the first item ID at the first memory location by using the first page ID associated with the first item ID and to locate the modified attribute associated with the second item ID at the third memory location by using the third page ID associated with the second item ID; and providing, over the network to the client device, the first attribute associated with the first item ID and the modified attribute associated with the second item ID.

5. The method of claim 4, wherein:

the first page ID is associated with the first item ID and the first memory location;

the first page ID is used to the locate the first attribute by searching the first memory location for the first attribute based on the association of the first page ID with the first memory location.

6. The method of claim 4, wherein:

the first object data includes first revision information indicating that the first object data represents a first version of the object data;

the first manifest data includes the first revision information which indicates that the first manifest data is associated with the first object data;

the second object data includes second revision information indicating that the second object data represents a second version of the object data; and the second manifest data includes the second revision information which indicates that the second manifest data is associated with the second object data.

7. The method of claim 4, wherein:

the DHT system includes a plurality of nodes operatively connected to one another, wherein the DHT system includes one or more key-value storage systems having an amount of memory capacity; and the DHT system is configured to determine which memory location to store the N items based on the amount of memory capacity.

8. The method of claim 7, wherein:

the first object data is representative of an order for a first amount of goods placed by a user at a first time;

the second object data is representative of a modification of the order; and the modified item is representative of a changed amount of the first amount of goods.

9. The method of claim 4, wherein:

the second manifest data includes a manifest key used to locate the second manifest data stored in the DHT system, the manifest key comprising an object ID associated with the second object data and a revision associated with a version of the second object data.

10. The method of claim 4, further comprising:

receiving a third item which includes a third item ID and a third attribute; and causing the DHT system to store the third item at a fourth memory location.

11. The method of claim 10, wherein:

the first object data is representative of an order placed by a user at a first time;

the second object data is representative of a modification of the order; and the third item is representative of an added ordered good.

12. The method of claim 10, further comprising generating third manifest data representative of:

the first item ID and the first page ID associated with the first item ID;

the second item ID and the third page ID associated with the second item ID; and the third item ID and a fourth page ID associated with the third item ID, wherein the fourth page ID is used to locate the third attribute stored at the fourth memory location.

13. The method of claim 4, wherein the second object data is received from the client device configured to receive inputs from a user for purchasing goods.

14. The method of claim 4, wherein the head record data, the second manifest data, the first item stored at the first memory location, and the modified item store at the third memory location are structured as a persistent B-tree data structure.

15. The method of claim 4, wherein the DHT system comprises a plurality of nodes including:
- a first node which includes the first memory location; and
- a second node which includes the second memory location, wherein the second node is operatively connected to the first node.

16. The method of claim 4, wherein the DHT system comprises a plurality of nodes including:
- a first node which includes the first memory location and the second memory location; and
- a second node which includes the third memory location, wherein the second node is operatively connected to the first node.

17. A method comprising:
- causing a distributed hash table (DHT) system to store N items at a plurality of memory locations, wherein a subset of the N items includes:
  - a first item stored at a first memory location as read-only data, the first item including:
    - a first item identification (ID) having a first characteristic, and
    - a first attribute;
  - a second item stored at the first memory location as read-only data, the second item including:
    - a second item ID having a second characteristic, and
    - a second attribute; and
  - a third item stored at a second memory location as read-only data, the third item including:
    - a third item ID having the first characteristic, and
    - a third attribute;
- generating first manifest data which includes:
  - the first item ID and a first page ID associated with the first item ID, wherein the first page ID identifies the first memory location used to locate the first attribute stored at the first memory location;
  - the second item ID and a second page ID associated with the second item ID, wherein the second page ID identifies the first memory location used to locate the second attribute stored at the first memory location; and
  - the third item ID and a third page ID associated with the third item ID, wherein the third page ID identifies the first memory location used to locate the third attribute stored at the second memory location, wherein the DHT system persistently stores the first item, the second item, the third item, and the first manifest data;
- storing a modified item at a third memory location as read-only data without performing a look up of the second item including the second item ID and the second attribute at the second memory location and without performing an update at the second memory location to change the second attribute associated with the second item ID to a modified attribute associated with the second item ID, the modified item including:
  - the second item ID having the second characteristic, and
  - the modified attribute that has been modified when compared to the second attribute;
- generating second manifest data which includes:
  - the second item ID and a fourth page ID associated with the second item ID, wherein the fourth page ID identifies the third memory location used to locate the modified attribute stored at the third memory location;
- generating head record data used to identify the second manifest data as being current manifest data, wherein the head record data, the second manifest data, the first item, the second item, the third item, and the modified item are structured as a persistent tree data structure;
- receiving, over a network, a request from a client device to provide one or more attributes associated with item IDs with the second characteristic;
- determining from the head record data that the second manifest data is the current manifest data;
- querying the second manifest data for the item IDs having the second characteristic;
- identifying, from the second manifest data, that the second item ID of the modified item includes the second characteristic;
- receiving, from the DHT system, the modified item having the second item ID with the second characteristic and the modified attribute, wherein the DHT system locates the modified item having the second item ID with the second characteristic at the third memory location by using the fourth page ID; and
- providing, over the network to the client device, the modified item having the second item ID with the second characteristic, and the modified attribute.

18. The method of claim 17, wherein:
- first object data includes the first item and the second item;
- second object data includes the modified item;
- the second manifest data includes a manifest key used to locate the second manifest data stored in the DHT system, the manifest key comprising an object ID associated with the second object data and a revision associated with a version of the second object data.

19. The method of claim 17, wherein:
- the first manifest data is associated with a first revision; and
- the second manifest data is associated with a second revision.

20. The method of claim 17, wherein:
- the DHT system includes a plurality of nodes operatively connected to one another, wherein the DHT system includes one or more key-value storage systems having an amount of memory capacity; and
- the DHT system is configured determine which memory location to store the N items based on the amount of memory capacity.

* * * * *

UNITED STATES PATENT AND TRADEMARK OFFICE
CERTIFICATE OF CORRECTION

PATENT NO. : 10,114,909 B1  
APPLICATION NO. : 14/275616  
DATED : October 30, 2018  
INVENTOR(S) : Andrew Ross Evenson et al.

Page 1 of 1

It is certified that error appears in the above-identified patent and that said Letters Patent is hereby corrected as shown below:

On the Title Page

(73) Assignee:  
Reads: Amazon Technlogies, Inc.  
Should Read: Amazon Technologies, Inc.

Signed and Sealed this  
Eighth Day of January, 2019

Andrei Iancu  
*Director of the United States Patent and Trademark Office*